United States Patent
Zoch et al.

(10) Patent No.: US 7,160,377 B2
(45) Date of Patent: *Jan. 9, 2007

(54) AQUEOUS, COLLOIDAL GAS BLACK SUSPENSION

(75) Inventors: Heinz Zoch, Maintal (DE); Werner Kalbitz, Rodenbach (DE); Stephan Lüdtke, Gelnhausen (DE); Thomas Lüthge, Hanau (DE); Ralph McIntosh, Hanau (DE); Gerd Tauber, Seligenstadt (DE)

(73) Assignee: Degussa AG, Düsseldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/534,860

(22) PCT Filed: Nov. 5, 2003

(86) PCT No.: PCT/EP03/12345

§ 371 (c)(1),
(2), (4) Date: May 13, 2005

(87) PCT Pub. No.: WO2004/046256

PCT Pub. Date: Jun. 3, 2004

(65) Prior Publication Data

US 2006/0011104 A1    Jan. 19, 2006

(30) Foreign Application Priority Data

Nov. 16, 2002    (DE) ................ 102 53 447

(51) Int. Cl.
*C09C 1/48*    (2006.01)
*C09C 1/56*    (2006.01)
*C09D 11/00*    (2006.01)

(52) U.S. Cl. ............... 106/31.8; 106/31.51; 106/31.52; 106/31.81; 106/476

(58) Field of Classification Search ............. 106/31.52, 106/31.81, 476, 31.51, 31.8
See application file for complete search history.

(56) References Cited

U.S. PATENT DOCUMENTS

| | | | |
|---|---|---|---|
| 3,687,887 A | 8/1972 | Zabiak | |
| 5,085,698 A | 2/1992 | Ma et al. | |
| 5,320,668 A | 6/1994 | Shields et al. | |
| 5,538,548 A * | 7/1996 | Yamazaki | 524/386 |
| 5,609,671 A * | 3/1997 | Nagasawa | 106/31.65 |
| 6,503,317 B1 | 1/2003 | Ortalano et al. | |
| 2004/0087707 A1* | 5/2004 | Zoch et al. | 524/495 |

FOREIGN PATENT DOCUMENTS

| | | |
|---|---|---|
| DE | 198 24 947 A1 | 12/1999 |
| DE | 10235027 A1 * | 2/2004 |
| EP | 0 297 839 A2 | 1/1989 |
| EP | 724968 A * | 8/1996 |
| EP | 1002839 A * | 5/2000 |
| EP | 1 394 221 A1 | 3/2004 |
| JP | 4-57865 A * | 2/1992 |
| JP | 11-217529 A * | 8/1999 |
| JP | 11-323229 | 11/1999 |
| WO | WO 96/18688 | 6/1996 |

* cited by examiner

*Primary Examiner*—Anthony J. Green
(74) *Attorney, Agent, or Firm*—Smith, Gambrell & Russell, LLP

(57) ABSTRACT

Aqueous, colloidal gas black suspension containing:
(a) a gas black, (b) an azo compound of the formula 1

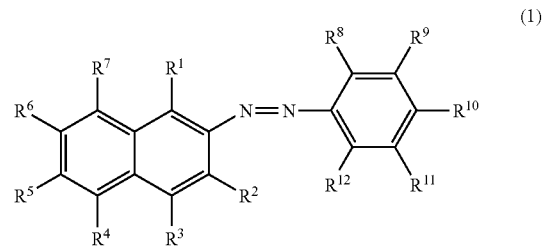

(c) and water. The aqueous, colloidal gas black suspension is produced by dispersing the gas black and the azo compound of the formula 1 in water. It can be used in the production of inks, ink-jet inks, surface coatings and colored printing inks.

19 Claims, 1 Drawing Sheet

Optical microscope image of reference suspension 3

Optical microscope image of the aqueous, colloidal gas black suspension 1 according to the invention

AQUEOUS, COLLOIDAL GAS BLACK SUSPENSION

The invention relates to an aqueous, colloidal gas black suspension, to a process for its production and to its use.

It is known to use aqueous, colloidal carbon black suspensions in the production of surface coatings, coloured printing inks and also directly as inks, for example in ink-jet printers (U.S. Pat. Nos. 5,085,698, 5,320,668).

It is also known to produce carbon black suspensions using dyes which at the same time act as wetting agents, without the addition of further wetting agents (PCT/US 99/11935).

It is further known to produce aqueous carbon black, suspensions using water-soluble wetting agents, for example acrylic resins (U.S. Pat. No. 5,609,671) or ethoxylates (DE 19824947 A1).

The known carbon black suspensions stabilised with wetting agents have the disadvantages that, when non-ionic surfactants are used, the zeta potential is too high and the surface tension is low and when anionic surfactants are used, the paper is wetted too greatly owing to the strong interactions with the paper coating, which is likewise anionic, leading to low optical densities.

Disadvantages of the known carbon black suspensions stabilised with dyes are their inadequate stability to storage and to freezing. When the dispersions have relatively long shelf lives or are stored at temperatures greater than 50° C. or less than 0° C., this leads to a pronounced and irreversible increase in the viscosity, to re-agglomeration of the suspended pigment particles or to complete flocculation of the suspension. Furthermore, when furnace blacks are used, a relatively low optical density is to be observed, which likewise constitutes a considerable disadvantage in terms of use.

The object of the present invention is to provide an aqueous gas black suspension which has high optical densities on carrier materials, such as, for example, paper, a low zeta potential and a high surface tension.

SUMMARY OF THE INVENTION

The invention provides an aqueous, colloidal gas black suspension which is characterised in that it contains a gas black, an azo compound of the general formula 1

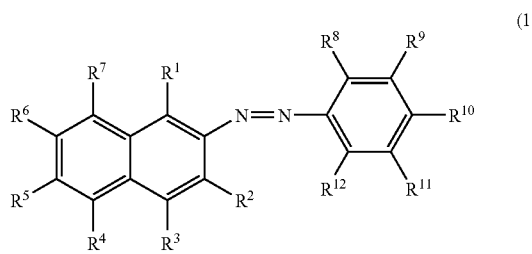

(1)

wherein $R^1$ to $R^{12}$ may be the same or different and consist of hydrogen, hydrophilic or hydrophobic groups, acceptor or donor substituents or parts of aliphatic, aromatic or heteroaromatic, acyclic, cyclic or polycyclic systems having acceptor, donor, hydrophilic or hydrophobic groups, and water.

Colloidal means the uniform distribution of particles having a diameter of from 10 nm to 10 μm in a dispersing agent.

For use in inks, a low viscosity is advantageous, depending on the printing process, in order to obtain the desired printing properties, for example sharpness of print. A low zeta potential, which describes the state of charge of the particles in the carbon black suspension, is a measure of the good stability of the suspension. A high surface tension has a positive effect, for example, on droplet formation in the ink-jet process. A high degree of dispersion is of fundamental importance for good storage stability, for good coloristic properties in use and for preventing blockage of the nozzles, particularly in the ink-jet process.

The gas black can have a content of volatile constituents (950° C.) of <21 wt. %, preferably <6 wt. %. The gas black can have a BET surface area of from 80 to 350 m$^2$/g. The gas black can have a primary particle size of from 8 to 40 nm, preferably from 13 to 30 nm, particularly preferably from 13 to 20 nm. The gas black can have a DBP number of from 40 to 200 ml/100 g.

The gas black can also be a mixture of different gas blacks.

There may be used as gas blacks, for example, Farbruβ FW 200, Farbruβ FW 2, Farbruβ FW 2 V, Farbruβ FW 1, Farbruβ FW 18, Farbruβ S 170, Farbruβ S 160, Spezialschwarz 6, Spezialschwarz 5, Spezialschwarz 4, Spezialschwarz 4A, NIPex 150, NIPex 160 IQ, NIPex 170 IQ, NIPex 180 IQ, Printex U, Printex V, Printex 140 U or Printex 140 V from Degussa AG.

The gas black content in the aqueous, colloidal carbon black suspension according to the invention can be less than 30 wt. %, preferably less than 20 wt. %.

DETAILED DESCRIPTION OF THE INVENTION

Figure 1A:
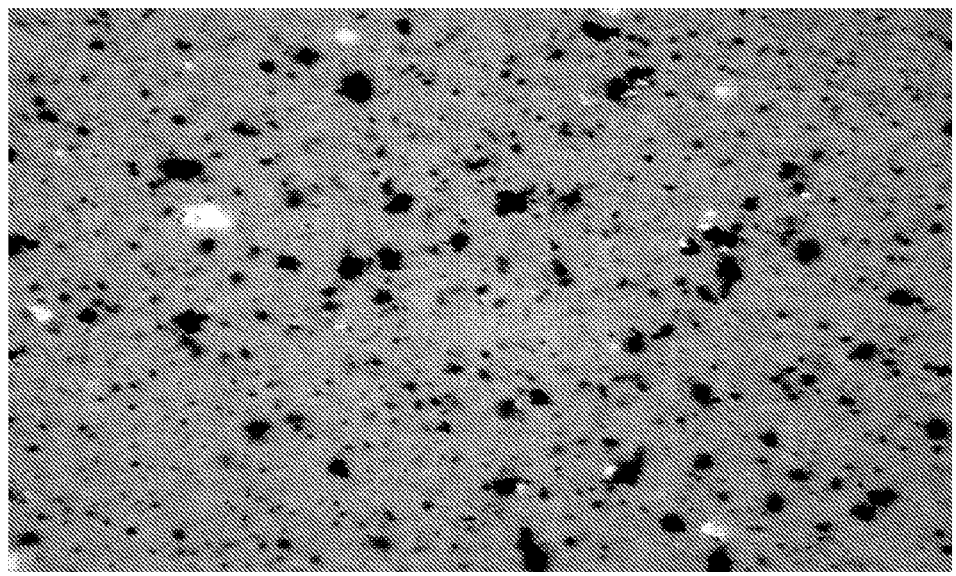
FIG. 1A shows an optical microscope image of the reference suspension 3.

The azo compound of the general formula 1 can contain the general formula 1 one or more times in the azo compound. The substituents $R^1$ to $R^{12}$ can be unsubstituted or substituted, aliphatic or aromatic substituents, such as phenyl, naphthyl or heteroaromatic substituents, such as, for example, pyrrolyl, pyridinyl, furyl or puryl, acceptor substituents, such as —COOR$^{13}$, —CO—R$^{13}$, —CN, —SO$^2$R$^{13}$ or —SO$_2$OR$^{13}$, wherein R$^{13}$=H, alkali metal cation, ammonium, alkyl, aryl or functionalised alkyl or aryl, such as, for example, ω-carboxyalkyl, HSO$_3$—C$_x$H$_y$—, H$_2$N—C$_x$H$_y$—, H$_2$N—SO$_2$—C$_x$H$_y$—(x=1–20; y=1–45), donor substituents, such as alkyl, aryl groups, OR$^{14}$, N(R$^{14}$)$_2$, SR$^{14}$ or P(R$^{14}$)$_2$, wherein R$^{14}$=H, alkyl, aryl or functionalised alkyl or aryl, oligomers or polymers of the form —(O—R$^{14}$)$_y$—OR$^{15}$, wherein R$^{15}$=H, alkyl or aryl.

As the azo compound of the general formula 1 there may be used, for example,

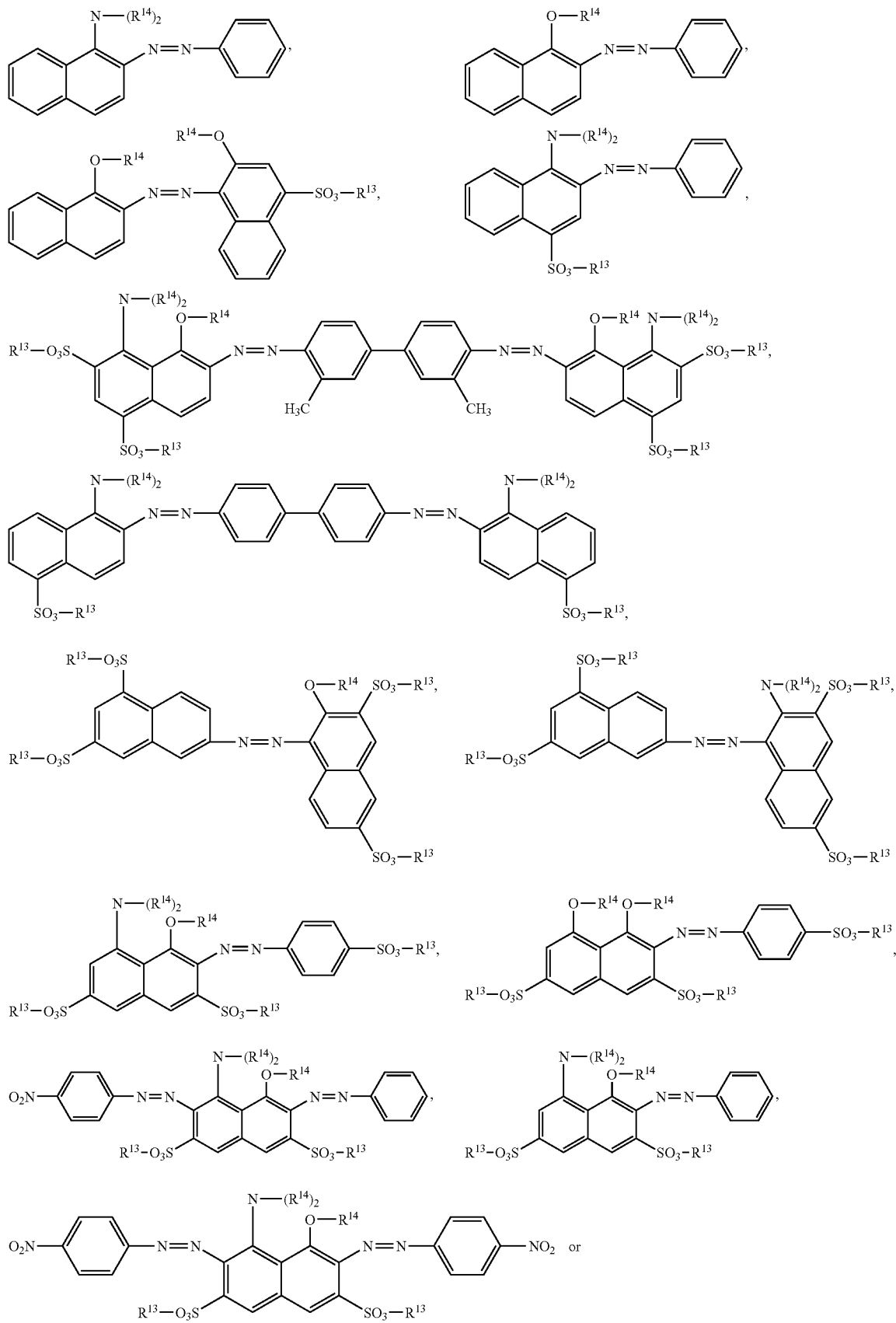

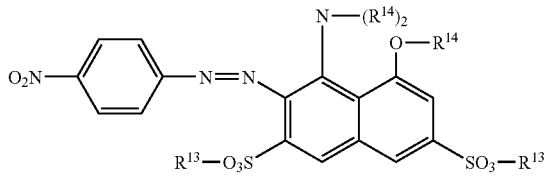

As the azo compound of the general formula 1 there may be used, for example, Acid Black 1 (C.I. 20470)

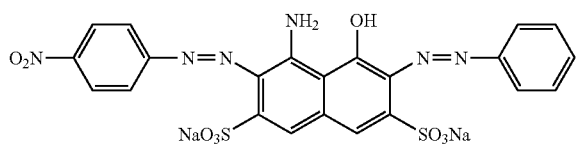

Mordant Green 17 (C.I. 17225) or

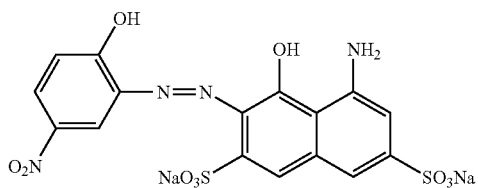

Mordant Blue 13 (C.I. 16680).

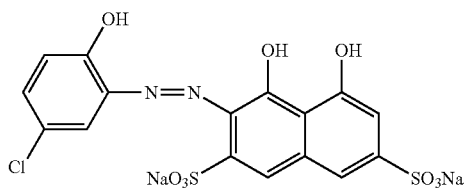

The amount of azo compound of the general formula 1 in the aqueous, colloidal carbon black suspension according to the invention can be less than 5 wt. %, preferably less than 3 wt. %.

The azo compound of the general formula 1 can contain less than 30 wt. %, preferably less than 20 wt. %, impurity.

The azo compound of the general formula 1 can contain less than 10 wt. %, preferably less than 5 wt. %, salt.

The azo compounds Acid Black 1, Mordant Green 17 or Mordant Blue 13 can contain less than 30 wt. % impurity and less than 10 wt. % salt.

The aqueous, colloidal gas black suspension according to the invention can contain biocides, wetting agents and/or additives.

The aqueous, colloidal gas black suspension according to the invention can contain a biocide. The biocide can be added in amounts of from 0.01 to 1.0 wt. %. There may be used as the biocide isothiazolinone derivatives, formaldehyde-cleaving agents or combination products of the two classes of product. For example, Parmetol from Schülke & Mayr, Ebotec from Bode Chemie, Acticide from Thor Chemie or Proxel from Zeneca can be used as the biocide.

It is further possible to add wetting agents in amounts of from 0 to 1 wt. %, preferably from 0.4 to 0.6 wt. %, based on the total suspension. There can be used as wetting agents classes of compounds such as fatty alcohol ethoxylates, polyacrylic acid or/and derivatives thereof, copolymers containing acrylic acid, acrylic acid derivatives, styrenes, styrene derivatives and/or polyethers, lignosulfonates alkylbenzenesulfonates, naphthalenesulfonic acid derivatives, copolymers containing maleic anhydride and/or maleic acid derivatives, or combinations of the mentioned wetting agents. The copolymers can be random or alternating block or graft copolymers. For example, Joncryl 678, Joncryl 680, Joncryl 682 or Joncryl 690 from Johnson Polymer B.V. can be used as the dispersion-assisting additive.

In a preferred embodiment, it is possible to use as the dispersion-assisting additive forms of styrene-acrylic acid copolymers which have been completely neutralised with ammonium or alkali hydroxide, especially with NaOH.

Other types of wetting agents are likewise suitable for the production of the carbon black suspension according to the invention.

It is also possible to add to the aqueous, colloidal gas black suspension according to the invention additives, such as alcohols, for example 1,5-pentanediol, glycols, such as dipropylene glycol, heterocyclic compounds, such as 2-pyrrolidone, or glycerol.

The amount of additives in the aqueous, colloidal gas black suspension according to the invention can be less than 25 wt. %, preferably less than 15 wt. %.

The invention also provides a process for the production of the aqueous, colloidal gas black suspension according to the invention, which process is characterised in that the gas black and the azo compound of the general formula 1 are dispersed in water.

The dispersion can be carried out using bead mills, ultrasonic devices, high-pressure homogenisers, microfluidizers, Ultra-Turrax or comparable apparatuses. Following the dispersion, the aqueous, colloidal gas black suspension can be purified by centrifugation and/or filtration.

The invention relates also to the use of the aqueous, colloidal gas black suspension according to the invention in inks, ink-jet inks, surface coatings and coloured printing inks.

This invention relates also to an ink which is characterised in that it contains the aqueous, colloidal gas black suspension according to the invention.

The advantages of the aqueous, colloidal gas black suspensions according to the invention are the high optical densities, low zeta potential, high surface tension, good storage stability and a high degree of dispersion.

EXAMPLES

Production of the Carbon Black Suspensions:

1. Preparation for the Production of the Suspensions:

All the constituents, except for the carbon black, are placed in a container and homogenised with stirring.

The carbon black is gradually incorporated into the solution with slow stirring (either by hand or using a slow stirring device).

2. Dispersion

The suspension prepared in point 1 is dispersed using an ultrasonic device. Very coarse particles can be separated from the resulting suspension in a centrifuge.

The compositions and properties of reference suspensions and of the aqueous, colloidal gas black suspension 1 according to the invention are shown in Table 1.

Chemicals

High-purity water (conductivity<0.1 μS/cm)
Sulfate stock solution $w(SO_4)$=1000 mg/l
Eluant $Na_2CO_3/NaHCO_3$ (2.2/2.8 mmol./l)

Equipment

Tumbler
Ion chromatograph with conductivity detector
Low-capacity ion exchanger

Principle

The samples are eluted in the tumbler for 1 hour at room temperature using high-purity water, and sulfate is determined in the eluate by ion chromatography.

Implementation

About 200 mg of sample are weighed into a closable test tube and eluted in the tumbler for 1 hour at room temperature using high-purity water.

TABLE 1

|  |  | Reference suspension 1 | Reference suspension 2 | Reference suspension 3 | Aqueous, colloidal gas black suspension of the invention 1 |
|---|---|---|---|---|---|
| NIPex 160 IQ | % | — | — | — | 15 |
| NIPex 90 | % | 15 | 15 | 15 | — |
| Acid Black 1 | % | 1.2 | 2 | 3 | 1.2 |
| Acticide MBS | % | 0.3 | 0.3 | 0.3 | 0.3 |
| Deionised water | % | 83.5 | 82.7 | 81.7 | 83.5 |
| Consistency of the suspension |  | solid | solid | liquid | liquid |
| Degree of dispersion by optical microscopy |  | n.a. | n.a. | poor | very good |
| Storage stability 50° C. over 28 days |  | n.a. | n.a. | sediment | very good |
| Optical density of an ink-jet ink 6 μm draw downs on Data Copy paper |  | n.a. | n.a. | n.a | 1.5 | n.a. = not applicable
NIPex 90 is a highly structured furnace black from Degussa AG having a primary particle size of 14 nm.
NIPex 160 IQ is a gas black from Degussa having a primary particle size of 20 nm.
Acticide MBS is a biocide from Thor Chemie.
As Acid Black 1 there is used Napthol Blue Black having the formula

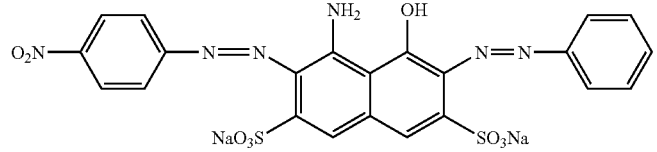

from Aldrich Chemical Company. The Acid Black 1 has a salt content of 1.5 wt. %.

Determination of the Salt Content

The salt content of the azo compound is the sum of sodium sulfate, measured by the sulfate concentration and converted to sodium sulfate, and sodium chloride, measured by the chloride concentration and converted to sodium chloride.

Determination of the Sulfate Concentration

Basis of the Process

A low-capacity ion exchanger is used as the separating column.

The elution of the ions is effected using electrolytes. A conductivity detector is used for the detection.

The suspension is then transferred to a measuring flask and filled to the mark with high-purity water. The measuring flask should be so chosen that the test solution contains from 0.5 to 40 mg/l $SO_4^{2-}$.

The test solution is injected into the ion chromatograph by way of a 0.2 μm injection filter. The sulfate concentration is calculated using the measured peak area.

Calculation $$w(SO_4^{2-})[\%] = \frac{\beta \cdot V \cdot 100}{m}$$

β = concentration of the test solution in mg/l
V = volume of the test solution in l
m = weighed amount in mg
100 = conversion factor in %

$$w(Na_2SO_4)\,[\%] = \frac{w(SO_4^{2-}) \cdot \text{Mol}\,(Na_2SO_4)}{\text{Mol}\,(SO_4^{2-})}$$

Mol ($SO_4^{2-}$) molecular weight $SO_4^{2-}$
Mol ($Na_2SO_4$) molecular weight $Na_2SO_4$ Determination of the Chloride Concentration Basis of the Process In order to determine the chloride content, the sample is suspended in high-purity water.

The chloride concentration is determined by means of argentometric titration.

Chemicals
High-purity water (conductivity<0.1 μS/cm)
Chloride stock solution, c(Cl⁻)=0.1000±0.0005 mol./l
Silver nitrate solution, c($AgNO_3$)=0.1 mol. mol./l or 0.01 mol./l
Nitric acid w($HNO_3$)=30%

Equipment
Titroprocessor 670 (Metrohm)
Silver rod electrode
Reference electrode (Hg/$HgSO_4$)

Principle

After production of the suspension, the suspension is acidified and titrated with silver nitrate.

Implementation

About 1 to 3 g of the sample are weighed into a glass beaker with an accuracy of 1 mg.

After addition of about 80 ml of high-purity water, stirring is carried out, the material adhering to the wall of the beaker above the level of the liquid being rinsed off with a little water.

After 5 minutes, the sample is acidified with nitric acid, the electrodes and the tip of the burette are immersed in the suspension and titration is carried out potentiometrically.

Calculation

The amount by weight w of chloride is calculated as follows:

$$w(Cl^-)\,\% = \frac{V_{Ag} \times c \times M \times 100 \times t}{m}$$

$V_{Ag}$ volume of the silver nitrate solution, in ml, consumed in the titration
c molarity of the silver nitrate solution [mol./l]
M atomic weight of chlorine
t titer of the silver nitrate solution $$w(NaCl)\,[\%] = \frac{w(Cl^-) \cdot \text{Mol}\,(NaCl)}{M}$$

Mol(NaCl) molecular weight of NaCl

The aqueous, colloidal gas black suspension 1 according to the invention is of low viscosity and exhibits a high optical density, good storage stability and a high degree of dispersion. Using the three reference suspensions produced from furnace black, a flowable suspension could only be obtained with reference suspension 3, only by substantially increasing the amount of Acid Black 1.

Figure 1B:
FIG. 1B shows an optical microscope image of the suspension 1 according to the invention.

FIG. 1 shows optical microscope images of the reference suspension 3 and of the aqueous, colloidal gas black suspension 1 according to the invention. The reference suspension 3 has a high content of coarse particles, or is partially flocculated, and accordingly does not fulfil the requirements made of an ink-jet ink. The gas black suspension 1 according to the invention, on the other hand, exhibits no appreciable content of coarse particles.

Table 2 shows reference suspensions with added anionic wetting agent (4) and non-ionic wetting agent (5) in comparison with the aqueous, colloidal gas black suspension 1 according to the invention.

TABLE 2

|  |  | Reference suspension 4 | Reference suspension 5 | Aqueous, colloidal gas black suspension of the invention 1 |
|---|---|---|---|---|
| NIPex 160 IQ | % | 15 | 15 | 15 |
| Disponil FES 32 IS | % | 6 | — | — |
| Hydropalat 3065 | % | — | 5 | — |
| Acid Black 1 | % | — | — | 1.2 |
| AMP 90 | % | 0.2 | 0.2 | — |
| Acticide MBS | % | 0.3 | 0.3 | 0.3 |
| deion. water | % | 78.5 | 79.5 | 83.5 |
| Zeta potential | mV | −15 | −4 | −35 |
| Surface tension | mN/m | 38 | 44 | 71 |
| Optical density (6 μm draw downs on Data Copy paper) |  | 1.21 | 0.9 | 1.5 |

Disponil FES 32 IS is an anionic wetting agent (fatty alcohol polyglycol ether sulfate) from Cognis.
Hydropalat 3065 is a non-ionic wetting agent (mixture of ethoxylated linear fatty alcohols) from Cognis.
AMP 90 is 2-amino-2-methyl-1-propanol from Angus Chemie.

In comparison with the aqueous, colloidal gas black suspension 1 according to the invention, the reference suspensions 4 and 5 stabilised with wetting agent exhibit too high a zeta potential and a low surface tension when non-ionic surfactants (5) are used, while excessive wetting of the paper and hence too low an optical density are observed when anionic surfactants (4) are used, owing to the strong interactions with the paper coatings, which are likewise anionic (Table 2).

Table 3 shows the formulations and properties of two aqueous, colloidal gas black suspensions 2 and 3 according to the invention:

TABLE 3

|  |  | Aqueous, colloidal gas black suspension 2 of the invention | Aqueous, colloidal gas black suspension 3 of the invention |
|---|---|---|---|
| NIPex 160 IQ | % | 15 | 15 |
| Acid Black 1 | % | 1.5 | 1.5 |
| IDIS @ solv.pd | % | 12 | — |
| Acticide MBS | % | 0.3 | 0.3 |
| dist. water | % | 71.2 | 83.2 |
| Optical microscope |  | 1 | 1 |
| Stable to freezing |  | yes | no |

TABLE 3-continued

|  |  | Aqueous, colloidal gas black suspension 2 of the invention | Aqueous, colloidal gas black suspension 3 of the invention |
|---|---|---|---|
| pH |  | 7.7 | 7.5 |
| Mean particle size | nm | <100 | <100 |
| Viscosity RT | mPas | 4.6 | 3.7 |
| Surface tension | mN/m | 68 | 74 |
| Zeta potential | mV | −35 | n.d. |
| Storage stability 50° C./7 days | mPas | 16* | <10* |
| Storage stability 50° C./14 days | mPas | 28* | 13* |
| Storage stability 50° C./28 days | mPas | 40* | 22* |

*= no sediment, no re-agglomeration
IDIS @ solv.pd is 1,3-propanediol from Degussa AG.

Study of the Degree of Dispersion by Optical Microscopy:

The degree of dispersion of the carbon black suspension samples is assessed at 400× magnification. Using the scale on the microscope, coarse particles>1 µm can readily be detected at that setting.

Determination of the Viscosity:

The rheological behaviour is determined in a rotation test with controlled shear rate (CSR) using a Physica Rheometer UDS 200. The viscosity value is read off at a shear rate of 1000 s$^{-1}$.

Determination of the Mean Particle Size:

The particle size distribution is determined using a photon correlation spectrometer (PCS), Horiba LB-500 type, and read off as the mean particle size of the indicated "median value". The measurement is carried out on an undiluted suspension sample.

Determination of the Surface Tension:

The dynamic surface tension is determined using a BP2 bubble tensiometer from Krüss. The end value is read off at 3000 ms.

Test of Storage Stability at 50° C. Over 28 Days:

The samples are stored at 50° C. in a drying cabinet for 28 days. The viscosity and tendency to sedimentation are studied.

300 ml of each suspension sample are stored for 28 days at 50° C. in a drying cabinet in a closed glass bottle. The formation of sediment at the bottom is checked with a spatula and the viscosity is measured using a Brookfield DV II plus viscometer. In addition, the formation of sediment in some samples when stored at room temperature is studied.

Test of Stability to Freezing:

The samples are frozen at −25° C. and, after thawing, the degree of dispersion is checked using an optical microscope.

A sample is evaluated as stable to freezing if, after thawing, the frozen sample has a highly liquid consistency again, no sediment forms and no re-agglomeration is visible under the optical microscope.

Determination of the pH:

The pH is determined on the undiluted suspension using a CG 837 pH meter from Schott. For that purpose, the glass electrode is immersed in the solution and the temperature-corrected pH is read off after five minutes.

Determination of the Zeta Potential:

The zeta potential is determined using a MBS-8000 from Matec. The samples are measured in the undiluted state. The zeta potential is determined by means of the electrokinetic sound amplitude (ESA).

Optical Microscope:

The degree of dispersion of the suspension samples is assessed at 400× magnification. Using the scale on the optical microscope, coarse particles>1 µm can readily be detected at that setting.

Scale of Ratings:

Rating 1: very good; no coarse fractions>1 µm,
Rating 2: satisfactory; very few coarse fractions>1 µm,
Rating 3: poor; many coarse particles>1 µm.

The aqueous, colloidal gas black suspensions 2 and 3 according to the invention fulfil all the requirements made of an optimum suspension.

Inks having a carbon black content of 4.5% are prepared from the gas black suspensions according to the invention using 2-pyrrolidone, 1,2-hexanediol, 1,3-propanediol, ethoxylated glycerol, dimethylaminoethanol and deionised water. For that purpose, the pre-mixture of ink additives is placed in a vessel, and the carbon black suspension is added carefully thereto, with stirring. The finished ink is filtered with a filter fineness of 500 nm. 6 µm draw downs are then produced on copier paper (type: Kompass Copy Office) using a K Control Coater application device, and the optical density is determined after 24 hours using a densitometer.

Printing tests are carried out using a Canon Office printer BJC-S750 and a HP Office printer 970 Cxi. For that purpose, the ink is first deaerated in vacuo and introduced into a cleaned original printer cartridge.

The Following Printing Tests Are Carried Out:

a. Single-sided printing on copier paper and on various commercially available ink-jet papers in order to determine the optical density and for visual assessment of the print quality.
b. Refire tests after 1-, 3- and 7-day pauses in printing in order to assess the start of printing or drying behaviour of the ink.

The printing results are summarised in Table 4.

The inks according to the invention are distinguished by very good printability, high optical densities and very good storage stability.

TABLE 4

| Ink formulation number | 1 | 2 |
|---|---|---|
| Carbon black concentration [%] | 4.5 | 4.5 |
| Ink formulation [%] |  |  |
| Aqueous, colloidal gas black suspension 2 of the invention | 30.0 | — |
| Aqueous, colloidal gas black suspension 3 of the invention | — | 30.0 |
| 2-Pyrrolidone | 12.0 | 12.0 |
| Liponic EG-07 (ethoxylated glycerol) | 3.0 | 1.5 |
| IDIS@solv.pd (1,3-propanediol) | — | 1.5 |
| IDIS@solv.hd (1,2-hexanediol) | 1.5 | 1.5 |
| deion. water | remainder | remainder |
| Dimethylaminoethanol | 0.02 | 0.02 |
| Optical microscope | 1 | 1 |
| pH | 8.9 | 8.9 |
| Viscosity [mPas] | 2.5 | 2.2 |
| Surface tension [mN/m] | 51 | 47 |

TABLE 4-continued

| Ink formulation number | 1 | 2 |
| --- | --- | --- |
| PRINTING TESTS | | |
| Office printer used | HP Deskjet 970 Cxi | Canon BJC S750 |
| Optical density (OD) on Kompass Copy Office | 1.59 | 1.50 |
| OD on Inkjet paper HP 51634 Z | 1.60 | 1.57 |
| OD on Inkjet paper CANON HR-101 | 1.68 | 1.65 |
| OD on Inkjet paper EPSON 720 dpi | 1.68 | 1.64 |
| Overall visual impression printed image | 1–2 | 1 |
| Nozzle blockages | none | none |
| Drying on the print head | none | none |
| REFIRE TEST | | |
| Start of printing after 60-min. pause in printing | + | + |
| Start of printing after 1-day pause in printing | + | + |
| Start of printing after 3-day pause in printing | + | + |
| Start of printing after 7-day pause in printing | + | + |

Note:
1 = very good; 2 = satisfactory; 3 = poor
+ = no problems with the start of printing; − = problems with the start of printing

The invention claimed is:

1. An aqueous, colloidal gas black suspension, comprising:
a gas black,
an azo compound of the formula 1

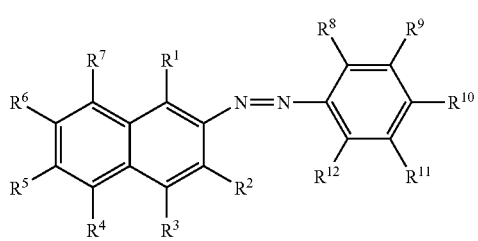

(1)

wherein $R^1$ to $R^{12}$ may be the same or different and consist of hydrogen, hydrophilic or hydrophobic groups, acceptor or donor substituents or parts of aliphatic, aromatic or heteroaromatic, acyclic, cyclic or polycyclic systems having acceptor, donor, hydrophilic or hydrophobic groups, and water.

2. The aqueous, colloidal gas black suspension according to claim 1, wherein the gas black has a content of volatile constituents (950° C.) of <21 wt. %, a BET surface area of from 80 to 350 m²/g, a primary particle size of from 8 to 40 nm and a DBP number of from 40 to 200 ml/100 g.

3. The aqueous, colloidal gas black suspension according to claim 1, wherein the gas black is present in the amount of <30 wt. %.

4. The aqueous, colloidal gas black suspension according to claim 1, wherein the azo compound of the formula 1 is present in an amount of <5 wt. %.

5. The aqueous, colloidal gas black suspension according to claim 1, wherein the azo compound of the formula 1 contains less than 30 wt. % impurity.

6. The aqueous, colloidal gas black suspension according to claim 1, wherein the azo compound of the formula 1 contains less than 10 wt. % salt.

7. The aqueous, colloidal gas black suspension according to claim 1, wherein the azo compound is Acid Black 1, Mordant Green 17 or Mordant Blue 13.

8. The aqueous, colloidal gas black suspension according to claim 7, wherein the azo compound Acid Black 1, Mordant Green 17 or Mordant Blue 13 contains less than 30 wt. % impurity and less than 10 wt. % salt.

9. The aqueous, colloidal gas black suspension according to claim 1, further comprising a biocide, wetting agent and/or additive.

10. The aqueous, colloidal gas black suspension according to claim 9, wherein the wetting agent is a fatty alcohol ethoxylate, polyacrylic acid or/and derivatives thereof, copolymer containing acrylic acid, acrylic acid derivatives, styrenes, styrene derivatives and/or polyethers, lignosulfonate, alkylbenzenesulfonate, naphthalenesulfonic acid derivative, copolymer containing maleic anhydride and/or maleic acid derivatives, or combinations of the mentioned wetting agents.

11. The aqueous, colloidal gas black suspension according to claim 9, wherein the wetting agent is present from 0 to 1 wt. %.

12. The aqueous, colloidal gas black suspension according to claim 9, wherein the additive is an alcohol, glycol, heterocyclic compound or glycerol.

13. The aqueous, colloidal gas black suspension according to claim 9, wherein the additive is present in an amount of <25 wt. %.

14. A process for the production of the aqueous, colloidal gas black suspension according to claim 1, comprising dispersing the gas black and the azo compound of the formula 1 in water.

15. The aqueous, colloidal gas black suspension according to claim 14, further comprising dispersing by using bead mills, ultrasonic devices, homogenisers, microfluidizers or mixers.

16. A composition of matter selected from the group consisting of an ink, ink-jet ink, surface coating and colored printing ink containing the aqueous, colloidal gas black suspension according to claim 1.

17. An ink composition containing the aqueous, colloidal gas black suspension according to claim 1.

18. The aqueous, colloidal gas black suspension according to claim 1, wherein the substituents $R^1$ $R^{12}$ can be phenyl, naphthyl, pyrrolyl, pyridinyl, furyl, puryl, —COOR$^{13}$, —CO—R$^{13}$, —CN, —SO$_2$R$^{13}$ or —SO$_2$OR$^{13}$, wherein R$^{13}$=H, alkali metal cation, ammonium, alkyl, aryl, ω-carboxyalkyl, HSO$_3$—C$_x$H$_y$—, H$_2$N—C$_x$H$_y$, H$_2$N—SO$_2$—C$_x$H$_y$—(x =1–20; y =1–45), donor substituents, that are alkyl, aryl groups, OR$^{14}$, N(R$^{14}$)$_2$, SR$^{14}$ or P(R$^{14}$)$_2$, wherein R$^{14}$=H, alkyl, aryl or functionalised alkyl or aryl, oligomers or polymers of the form—(O—R$^{14}$)$_y$—OR$^{15}$, wherein R$^{15}$=H, alkyl or aryl.

19. The aqueous, colloidal gas black suspension according to claim 1, wherein the azo compound is Acid Black 1 (C.I. 20470)

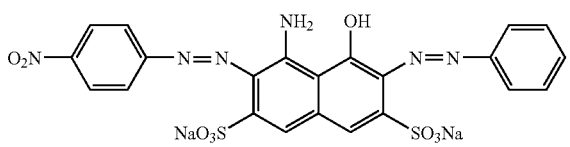

15
or
Mordant Green 17 (C.I. 17225)
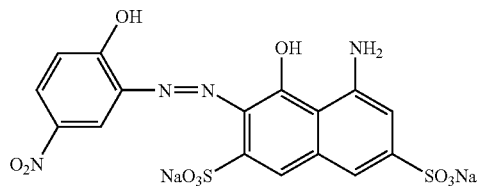
16
or
Mordant Blue 13 (C.I. 16680)
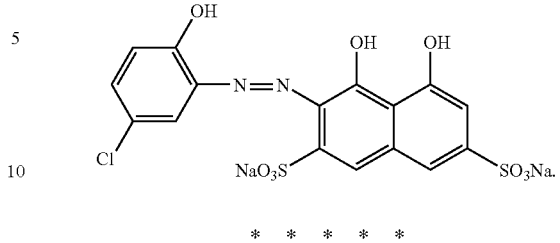
* * * * *